United States Patent

[11] 3,590,514

| [72] | Inventor | Daniel P. Begley |
| | | 510 Willow St., Shafter, Calif. 93263 |
| [21] | Appl. No. | 839,030 |
| [22] | Filed | July 3, 1969 |
| [45] | Patented | July 6, 1971 |

[54] FISHING LURE AND METHOD FOR MAKING
7 Claims, 7 Drawing Figs.

[52] U.S. Cl............................................... 43/42.53,
43/42.28, 43/42.29, 43/42.37, 43/42.39
[51] Int. Cl................................................ A01k 85/00
[50] Field of Search............................................ 43/42.26,
42.28, 42.37, 42.53, 42.25, 42.29, 42.39

[56] References Cited
UNITED STATES PATENTS

| 1,910,742 | 5/1933 | Binns............................ | 43/42.28 X |
| 1,949,582 | 3/1934 | Pott............................. | 43/42.25 |
| 2,111,020 | 3/1938 | Arbogast...................... | 43/42.28 |
| 2,618,094 | 11/1952 | Shindler........................ | 43/42.53 X |
| 2,757,476 | 8/1956 | Pender......................... | 43/42.25 |
| 2,787,859 | 4/1957 | Bay.............................. | 43/42.28 |

*Primary Examiner*—Samuel Koren
*Assistant Examiner*—Daniel J. Leach
*Attorney*—Vergil L. Gerard

ABSTRACT: This disclosure relates to a fishing lure and the method for making it. The fishing lure is made by molding a weighted head adjacent the eye end of a fishhook with the eye protruding from the head. A tie wire is also molded in the head and is utilized to wrap a sheet of shreadable rubber intermediate its ends about the shank of the hook adjacent the molded head. The rubber is then shredded at its ends to form a shredded hook skirt which covers and extends beyond the barb end of the hook and a neck skirt which projects outward from the point of wrap adjacent the molded head. A flexible tail may be added by impaling its lead end with the barb of the hook.

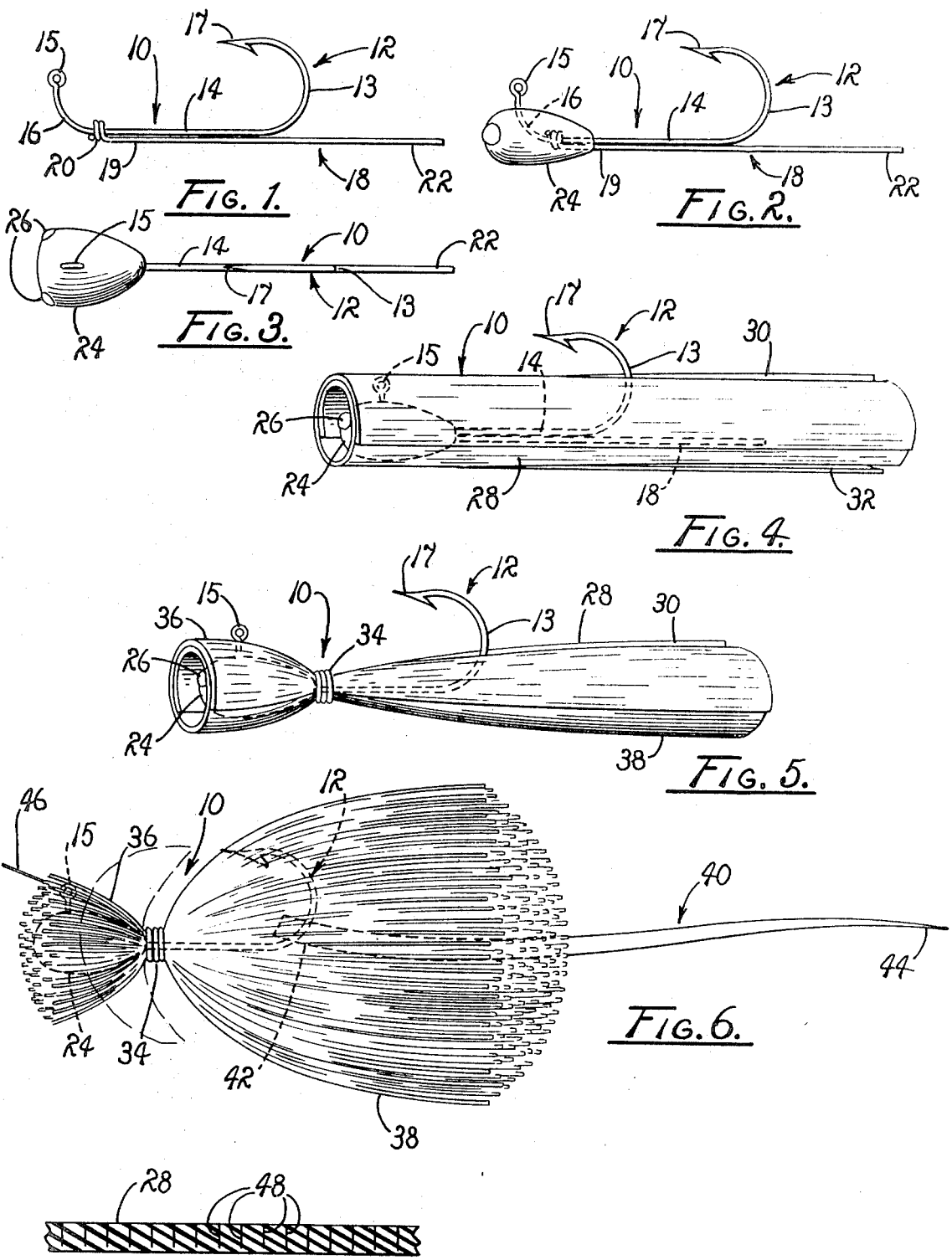

FISHING LURE AND METHOD FOR MAKING

This invention relates generally to fishing lures and methods for making them, and more particularly to sinking, plug-type lures which appear animated in use.

In the sport of fishing a constant effort is being made to develop lures which are more attractive to fish. In recent years with the availability of more versatile materials such as shredded rubber and plastics, lures have been developed which incorporate these materials in various manners.

Attempts have also been made in the lure art to develop lures which appear animated in use and are suited to particular types of fishing.

Because of the increased access of fishing areas to the public and the increasing popularity of the sport, the need for better lures is an ever increasing one.

It is, therefore, a major object of my invention to provide a sinking plug-type fishing lure which is more attractive to fish.

It is another object of my invention to provide a fishing lure of the type described which appears animated in the water, is easy to spot-cast, and travels well near the bottom of a body of water.

It is a further object of my invention to provide a fishing lure of the type described which has but one hook rigidly secured to the body and projecting upward therefrom in use, and is, therefore, less likely to become entangled with debris, and when so entangled is easier to free.

It is still another object of my invention to provide a fishing lure of the type described which is durable, and sufficiently easy to make and use to permit its use by inexperienced fishermen.

It is still a further object of my invention to provide a method for making a fishing lure of the type described which can be performed by hand or machine, utilizes inexpensive, readily available components, and permits substantial variations in the resulting lure.

These and other objects and advantages of my invention will become more readily apparent from the following detailed description of a preferred embodiment of my fishing lure and method for making it when read together with the accompanying drawings in which:

FIG. 1 is a side elevation of a preferred embodiment of my fishing lure in the first step of making;

FIG. 2 is a side elevation of the embodiment shown in FIG. 1 in the second step of making;

FIG. 3 is a plan view of the fishing lure in its second step of making;

FIG. 4 is a side elevational view of the fishing lure in its third step of making;

FIG. 5 is a side elevational view of the fishing lure in its fourth step of making;

FIG. 6 is a side elevational view of the completed fishing lure; and

FIG. 7 is a plan view of a section of the material used to form the skirts on my fishing lure.

Referring now to the drawings, the numeral 10 indicates generally my fishing lure in the various steps of its making. As best shown in FIG. 1, the lure 10 is made by starting with a fishhook 12 having a barb end 13 connected by a shank 14 to a tie eye 15. The shank 14 adjacent the eye 15 is bent to form a neck 16 which positions the eye substantially normal to the axis of the shank in the same direction and coplanar with barb 17 on the barb end 13.

A tie wire 18 is secured at its proximal end 19 to the shank 14 adjacent the neck 16 by securing coils 20. The distal end 22 of the tie wire 18 extends rearward beyond the barb end 13 of the hook 12, parallel to and adjacent the shank 14.

After the tie wire 18 has been thus positioned and secured with respect to the fishhook 12, a weighted head 24 is molded about the shank 14 adjacent the neck 16 and encompassing the securing coils 20 of the tie wire 18. The eye 15 protrudes from the head 24, as best shown in FIG. 2. The head 24 is generally tear-shaped in plan view, as shown in FIG. 3, and has a pair of symmetrical bulges 26 at its forward end to simulate eyes. The head is formed of a lead alloy or other suitable material which is easy to mold and yet has sufficient strength after molding to hold its shape and sufficient weight to provide the desired balance for the lure. In this preferred embodiment, the head weighs approximately one-half ounce and is used with a No. 2 hook. The lure has an overall length of 1¾ inches from the front end of the head 24 to the rearwardmost portion of the barb end 13 and the head itself has a length of approximately three-quarters of an inch. This relationship of weights and sizes is not a limiting feature of my invention, of course, but has been found to give proper balance to the fishing lure and is, therefore, recited to further detail the interrelationship of components. When the molding of the head 24 has been completed the head is painted some appropriate color (black in this preferred embodiment) and the bulges 26 are painted to simulate eyes (white in this preferred embodiment).

Next, a sheet 28 of shredable rubber or other suitably shredable, flexible, and reasonably resilient material is disposed adjacent the shank 14 and formed into encircling relationship with the shank 14 and the head 24 (see FIG. 4). In my preferred embodiment, the sheet 28 has an overall length of about 4½ inches and is disposed with its forward end about one-quarter inch ahead of the forward end of the head 24. The sheet 28 has a split 30 to permit the barb end 13 of the fishhook 12 to protrude and has a second split 32 to permit the tie wire 18 to be pulled through the sheet for the purpose of securing the sheet to the shank 14. The sheet 28 is secured to the shank 14 by wrapping the distal end 22 of the tie wire 18 about the sheet and the shank 14 at the base of the head 24 to form wrap connection 34 (see FIG. 5). Any excess of the distal end 22 of the tie wire 18 not needed to form the wrap connection 34 is cut away after the wrap connection is formed to leave a smooth connection.

To complete the lure the forward portion of the sheet 28 is shredded to form hook skirt 36 and the rearward portion of the sheet 28 is shredded to hook skirt 38 (see FIG. 6).

If desired, a tail 40 may be added to the lure by cutting away the head portion of a synthetic night crawler lure, readily available on the market, to provide the tail with a front portion 42 and rear portion 44. The front portion 42 is then impaled by the hook 12 by inserting the barb 17 into the front portion 42 of the tail 40 and permitting the rear portion 44 to extend rearwardly of the lure in the manner shown in FIG. 6.

In FIG. 7 I have shown a partial cross section of the sheet 28 illustrating the serrations 48 which provide the sheet with a shredable quality.

In use, a fishing line 46 is secured to the tie eye 15 and the lure is spot-cast to the desired location. As the lure sinks toward the bottom the drag of the line on the tie eye 15 positions the lure with the hook 12 directed upwardly as shown in FIG. 6. The lure is then retrieved and as it moves through the water the neck skirt 36 is folded back over the wrap connection 34 in the manner shown in phantom, in FIG. 6. If the lure contacts the bottom during retrieving, it is not likely to become entangled with debris because of the position of the hook.

From this description it will be understood that the lure of my invention is a casting-type lure particularly effective as a bass plug. Since the lure sinks, it is retrieved fairly rapidly in shallow water, more slowly in water of medium depth, and slowly with pauses in deep water. Drawing the lure through the water sweeps the neck skirt 36 backward, as previously explained, and exposes the head 24 to provide the lure with an appearance which experience has shown to be particularly attractive to fish. By varying the speed at which the lure is retrieved, considerable movement can be added to neck skirt 36 and hook skirt 38 to provide a highly animated lure.

From this detail description of my lure and the method of making it, it will be understood that the lure attains the objects and provides the advantages heretofore attributed to it. Particularly, the lure is easy and inexpensive to make by reason of the commercial availability of all components except the head 24. It is also durable, easy to use and quite susceptible to variations in appearance. Although in my preferred embodiment the head is tear-shaped and painted black with white eyes, different shapes and colors may easily be used. Also, the color of the sheet 28 used to make the neck skirt and hook skirt can be varied, as can the lengths and shapes of the skirts and the option of attaching the tail 40, or other suitable attachments in varied colors. It is also possible, of course, to add components with luminescent colors or light-reflecting surfaces to produce a flashing effect.

I claim:

1. A method for making a fishing lure comprising the following steps:

first, on a fishhook having securing means at the forward end thereof, hook means at the rearward end thereof, and a shank interconnecting said securing means and said hook means, forming adjacent the forward end thereof and integral with said shank a head-shaped weight with said securing means protruding forwardly thereof;

second, encircling said shank with a shredable sheet of flexible material having a length equal to or greater than the length of said fishhook and disposing said sheet with its forward end extending over said weight at the forward end of said fishhook and its rearward end extending over said hook means at the rearward end;

third, securing said sheet intermediate its ends tightly about said shank at a point just rearward of said weight by encircling said sheet with a tie, with the remainder of said sheet free from said fishhook; and fourth, shredding said unsecured portions of said sheet, to provide a forward shredded shroud extending outwardly and forwardly from said securing point over the said weight and a rearward shredded shroud extending outwardly and rearwardly from said securing point over said hook means.

2. A method for making a fishing lure as described in claim 1, in which:

said first step further includes forming said head-shaped weight with a tie wire having a proximal end anchored in said weight and a distal end extending outwardly and rearwardly from said weight; and said third step further includes securing said shredable sheet to said shank by wrapping said tie wire distal end about said sheet at said securing point.

3. A method for making a fishing lure as described in claim 1, in which:

said second step further includes using a shredable sheet formed of material which is resilient and prescored to facilitate shredding.

4. A method for making a fishing lure as described in claim 2, in which:

said second step further includes using a shredable sheet formed of material which is resilient and prescored to facilitate shredding.

5. A method for making a fishing lure as described in claim 2, in which:

said first step further includes using a tie wire of malleable material capable of maintaining a given configuration; and said third step further includes forming said tie wire distal end into a spiral configuration about said sheet at said securing point.

6. A method for making a fishing lure as described in claim 5, in which:

said second step further includes using a shredable sheet formed of material which is resilient and prescored to facilitate shredding 7. A method for making a fishing lure as described in claim 1, which further includes:

fifth, securing a flexible elongated member to the hook end of said fish hook.